United States Patent [19]

Pickett

[11] 4,310,175
[45] Jan. 12, 1982

[54] BELT CLAMPING APPARATUS WITH SELF-ALIGNING FEATURE

[75] Inventor: David A. Pickett, Warren, Mich.

[73] Assignee: Allied Corporation, Morris Township, Morris County, N.J.

[21] Appl. No.: 122,213

[22] Filed: Feb. 19, 1980

[51] Int. Cl.³ .............................................. A62B 35/02
[52] U.S. Cl. ................................ 280/801; 24/230 AS; 242/107.2
[58] Field of Search ............... 280/808, 805, 801, 470, 280/479, 483, 804; 24/230 AS; 242/107.4 A, 107.2

[56] References Cited

U.S. PATENT DOCUMENTS

| | | | |
|---|---|---|---|
| 3,639,948 | 2/1972 | Sherman | 24/230 AS X |
| 4,040,576 | 8/1977 | Walker et al. | 242/107.4 A |
| 4,045,079 | 8/1977 | Arlauskas et al. | 242/107.4 A X |
| 4,163,530 | 8/1979 | Kondo | 280/808 |
| 4,193,565 | 3/1980 | Tamura | 242/107.4 A |
| 4,243,185 | 1/1981 | Montonami et al. | 242/107.4 A X |

Primary Examiner—David M. Mitchell
Assistant Examiner—Norman L. Stack, Jr.
Attorney, Agent, or Firm—Roger H. Criss

[57] ABSTRACT

A belt clamping apparatus is disclosed including a pivotal lever over which the belt is directed. A universal mounting bracket assembly is provided for the lever. A clamp bar is carried by the lever including a first clamping area for contacting the belt and clamping the belt against a corresponding second clamping area substantially fixed relative to the mounting bracket. The clamping bar is retained within an open channel and is provided with a centrally located spherical dome on its back side to provide point contact with the internal flat surface of the retainer channel on the mounting lever. The point contact assures multi-directional rocking or floating movement of the bar when the lever is actuated by a predetermined force on the belt assuring maximum restraining action.

5 Claims, 6 Drawing Figures

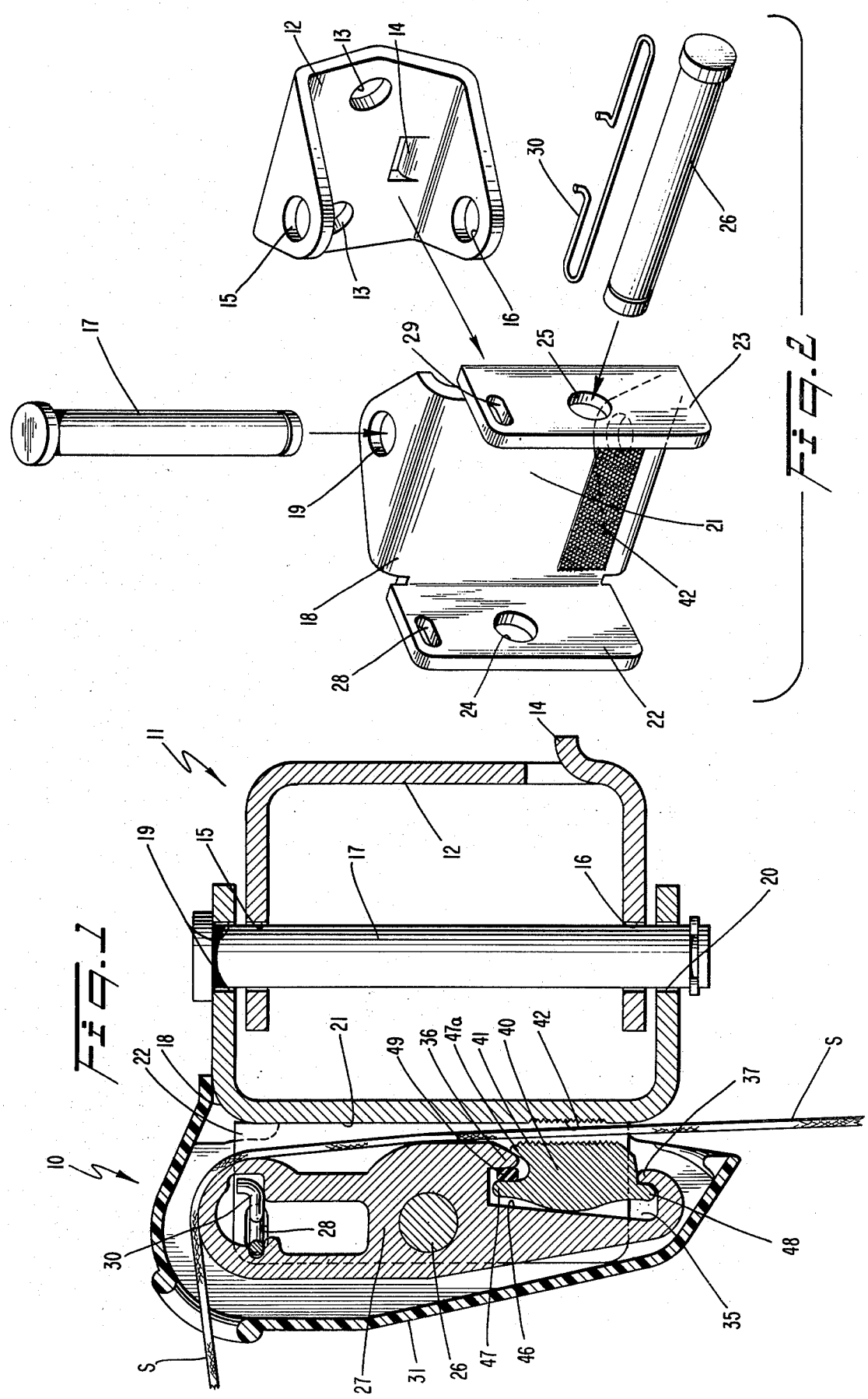

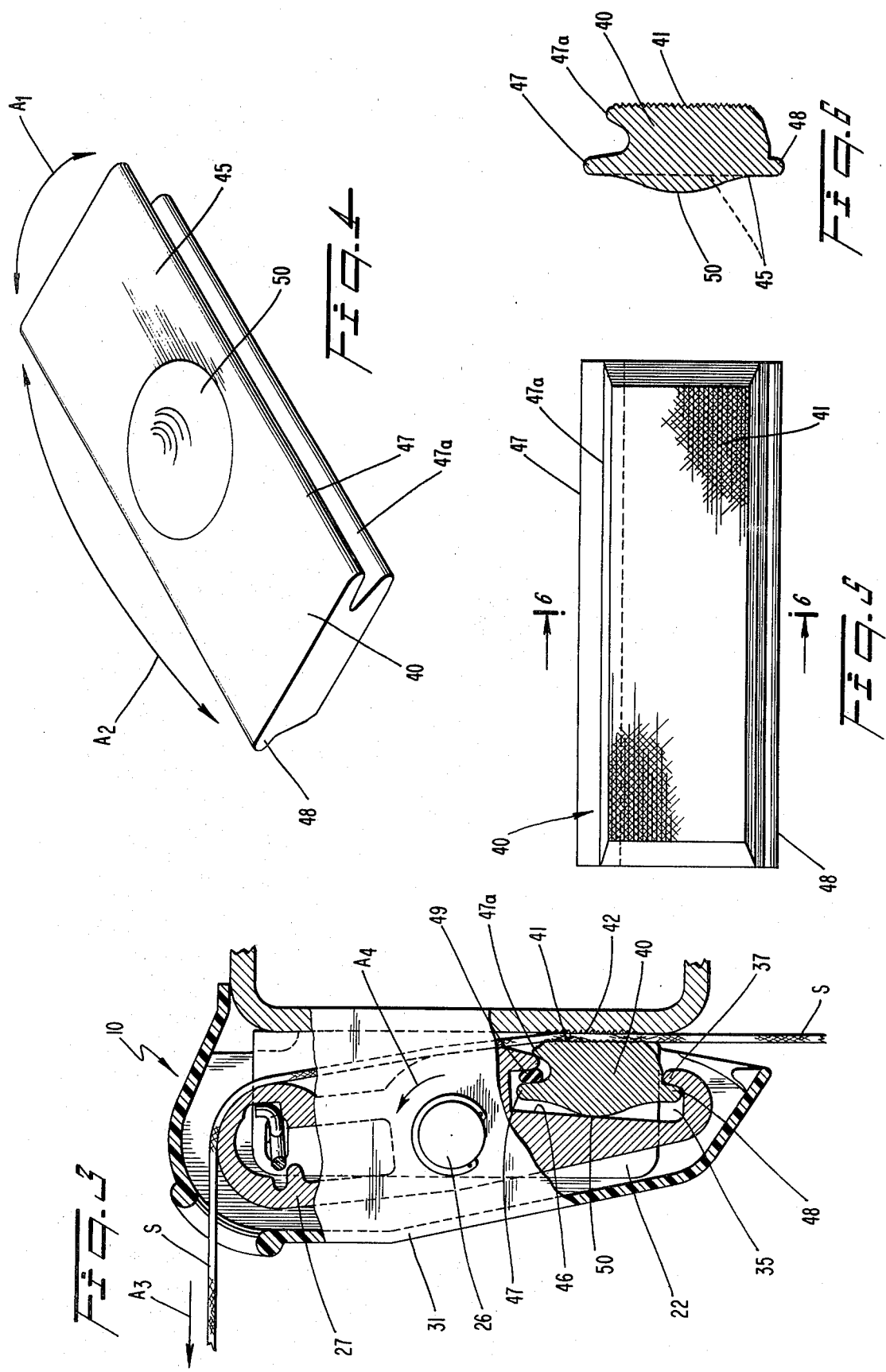

BELT CLAMPING APPARATUS WITH SELF-ALIGNING FEATURE

BACKGROUND OF THE INVENTION

The present invention relates to belt clamping apparatus, and more particularly to a belt-through clamping apparatus utilizing a lever with a simplified clamp bar to clamp the belt with substantially uniform clamping force in all directions across the clamping area.

Recently, there has been a development in the industry to provide a belt-through clamping apparatus for the safety belt harness. The belt passes through the apparatus as the belt travels from the retractor assembly and turns to go across and into restraining engagement with the occupant of the vehicle. This additional clamping apparatus, most commonly associated with the shoulder safety belt and positioned adjacent the top of the B-pillar of the vehicle, is used to absorb some or all of the load caused by the restraining force of the belt on the occupant in an accident. Such a clamping apparatus can be made load-sensitive at any desired level and can be used either in conjunction with a locking belt retractor or with a non-locking retractor.

In order to provide efficient clamping of the belt, it has previously been found necessary to provide some aligning or compensating means to offset variations in the belt thickness, as well as to compensate for manufacturing tolerances in the parts. When this is done, a substantially uniform force is applied by the clamp bar substantially across the full area of the clamping surface. One successful clamping apparatus of the self-aligning type is disclosed and claimed in the prior U.S. patent application to R. C. Pfeiffer et al. entitled "Seat Belt Clamp Apparatus and Occupant Restraint System," Ser. No. 10,455, filed Feb. 8, 1979, and assigned to the assignee of the present invention. While this prior clamping apparatus met the objectives set forth, the arrangement required the clamping lever to be mounted on a resilient pivot pin. In such an arrangement, the resilient pin mounting acts to cause the entire clamping lever to turn or skew in the direction transverse to the belt in order to compensate for variations across the belt, such as a lateral variation in the belt thickness, as mentioned above. However, since the belt itself travels around and over the clamping lever to actually institute the clamping force, it is possible that false skewing action could be induced by the belt, thus giving a false alignment movement to the lever and allowing less than the full compensating action to the clamping bar. Furthermore, the concept of resiliently mounting the lever adds considerable expense to the cost of this prior belt-through clamping apparatus, not only in initial parts costs, but also in the assembly process.

Thus, it is a first and primary object of the present invention to provide a belt-through clamping apparatus in which the compensating action of the clamping lever is independent of the mounting shaft for the lever.

It is another and related object of the present invention to provide an improved self-compensating clamping apparatus that provides maximum uniformity of force across the full clamping surface, but is also low-cost and easy to manufacture.

It is another object of the present invention to provide a belt-through clamping apparatus in which the clamping element engages the pivotal clamping lever at a point contact to allow aligning and compensating movement in all directions, both in the direction of the belt and transverse to the belt, as well as in all directions inbetween.

SUMMARY OF THE INVENTION

The belt clamping apparatus of the present invention provides a pivotal lever over which the safety belt of an occupant restraint system passes as a belt travels from the retractor of the engaging position over the shoulder and chest of the occupant. The belt as it passes through the clamping apparatus changes direction and thus replaces the prior art simple loop bracket that has previously performed this function in this type of belt restraint system. Because the lever is pivotally mounted, it is sensitive to a pull on the belt when a force above a predetermined amount is applied to the belt. The predetermined force causes the lever to contact the belt and clamp the belt to provide a portion or all of the clamping force required in the restraint system.

The pivoting lever is provided with a dual swivel or universal mounting bracket so that the lever tends to track the direction of passage of the belt through the clamping apparatus. The lever has a clamping position, which is reached by pivoting of the lever about a generally horizontal axis in response to reaching the threshold force on the belt. A spring is provided to return the lever to the non-clamping position once the force on the belt has been released. The stiffness of this return spring is normally selected to establish this predetermined threshold force where activation of the clamping action occurs.

A clamp bar is carried by the lever in an open restraining channel extending substantially parallel to the axis of the pivot shaft for the lever. The clamp bar includes a first clamping area that contacts the belt and clamps the belt against a corresponding second clamping area substantially fixed relative to the mounting bracket. The open channel is provided with retaining lips to retain the clamp bar on the lever. In accordance with the invention, a universal rocking means is provided between a first surface on the clamp bar which is formed on the back side of the clamp bar, that is the side of the clamp bar opposite the clamping area, and a second corresponding facing surface in the retaining channel. The rocking means takes the form of a spherical dome so as to provide substantially point contact between the clamp bar and the lever that carries the bar. With this arrangement, it will be realized that the clamping bar is universally moveable, or floats, with respect to the supporting surface so as to automatically adapt to the surface of the belt against which the first clamping area engages. This action provides a substantially uniform clamping force in all directions along and across the belt over the full area of contact of the belt. This full contact assures maximum frictional engagement, and thus maximum clamping force of the clamping apparatus, as is desired.

Preferably, the spherical dome is formed on the back face of the clamp bar. This provides the most economical manner in which the clamping apparatus of the present invention can be manufactured and assembled. Since the spherical dome acts against the inner flat surface of the open channel, the clamping bar can rock either transversely or in the direction of the belt, or in any direction between these two. The clamping bar uniquely compensates for any variation of the belt thickness or because of any minor misalignments between the lever and the stationary clamping area caused by tolerances in the parts.

The clamping apparatus of the present invention is inexpensive to manufacture compared to the prior art apparatus that performs the same function, since the expense of a spring mounting of the pivot shaft and the attendant expense of assembling the spring on the shaft is completely eliminated. Furthermore, since the compensating movement is totally independent of the mounting shaft for the lever, there is no possibility that the direction of the belt across the lever or sudden changes in direction of the belt can provide a false compensating movement of the clamping bar, as is a possibility with the prior art structure. Also, since there is solid contact both at the pivot shaft and between the lever and the clamp bar, the adjustment of the action of the clamping apparatus is dependent only upon the single return spring, that is the biasing spring that returns the pivoting lever to the non-clamping position.

The spherical dome is positioned centrally on the back side of the clamping bar. The point contact occurs between the dome and the flat channel surface with which it mates. As the clamping bar rocks or floats within the channel, the point of contact moves thus providing automatic compensation for the variations mentioned. A resilient strip is provided between the upper lip of the channel and the upper dual retainer shoulders on the clamping bar. This resilient strip keeps the clamping bar centered in the non-clamping position and is compressed or expanded selectively along its length during clamping depending upon the compensating action necessary as the clamping bar contacts and presses against the belt. With the resilient strip held captive between the dual retainer shoulders and the upper lip of the open channel, there is a desirable, slight resilient action of the clamping bar as it tends to follow the belt in the direction of travel caused by the restraining force on the occupant. However, the solid, point contact between the clamping bar and the facing inner surface of the channel is maintained so that the desirable rocking action in any direction can occur as necessary.

BRIEF DESCRIPTION OF THE DRAWINGS

These and other features and advantages of the invention are presented in the following detailed description of the preferred embodiment, taken in conjunction with the accompanying drawings, wherein:

FIG. 1 is a cross-sectional view taken through the clamping apparatus and the dual swivel mounting bracket therefor;

FIG. 2 is an exploded view showing the dual swivel mounting bracket assembly and including the pivot shaft for the clamping lever and the lever return spring;

FIG. 3 is a cross-sectional view of the clamping apparatus shown in operation with the required predetermined force being applied to the lever to clamp the belt passing through the apparatus;

FIG. 4 is a perspective view showing the clamp bar with the spherical dome positioned on the back surface thereof;

FIG. 5 is a front view of the clamp bar showing the diamond knurled area for engagement with the belt; and FIG. 6 is a cross-sectional view taken through the center of the clamp bar along line 6—6 of FIG. 5.

DETAILED DESCRIPTION OF THE PREFERRED EMBODIMENT

With reference now to FIG. 1 of the drawings, a more detailed review of the important aspects of the preferred embodiment shown can be made. A belt clamping apparatus, generally designated by the reference numeral 10 is mounted on a dual swivel or universal mounting bracket assembly 11 with a occupant restraint belt S passing through the clamping apparatus 10. As shown, it is to be understood that the lower end of the belt S may be extended to a conventional belt retractor (not shown) and the upper end of the belt S extends down across the shoulder of the occupant of the vehicle, across the occupant's chest and is to be connected to a conventional buckle (also not shown). In making the pass through the clamping apparatus 10, the belt makes a 90° turn, and this turn is the same as the turn that is normally made by a shoulder belt through a conventional loop bracket attached to the upper portion of a B-pillar in a vehicle (also not shown). For a more complete understanding of the exact nature of the environment in which the present invention can be used, reference is made to the above-mentioned prior U.S. application of Pfeiffer et al., Ser. No. 10,455 filed Feb. 8, 1979.

The mounting bracket assembly 11 includes a U-shaped base bracket 12 having mounting apertures 13 through which suitable fasteners (not shown) attach to the B-pillar of the vehicle. A separate locating tab 14 may be provided to engage a slot formed in the pillar. Openings 15, 16 in the parallel, horizontal legs of the bracket 12 receive a vertically-disposed mounting shaft or pin 17. Carried by the shaft 17 is a swivel or universal bracket 18 with corresponding upper and lower mounting holes 19, 20.

The universal bracket 18 includes a center panel 21, which is substantially vertically disposed and two integral side panels 22, 23. Mounting holes 24, 25 in the side panels 22, 23, respectively, receive pivot shaft 26, which is thus substantially horizontally positioned (note FIG. 1 in conjunction with FIG. 2). Mounted for pivotal movement on the shaft 26 is pivotal clamping lever 27. The side panels 22, 23 are provided with slots 28, 29 adjacent the top portion thereof in which is mounted a compression-type lever return spring 30. The upper portion of the lever is hollow so as to house the spring 30, as best shown in FIG. 1. A cover 31 is provided as a part of the belt clamping apparatus 10 (see FIG. 1).

Adjacent the lower end of the lever 27 is an open retainer channel 35 that extends across the lever substantially parallel to the horizontal pivot shaft 26. Adjacent the front of the channel are upper and lower retainer lips 36, 37, respectively.

Positioned within the channel 35 is a clamp bar 40, constructed in accordance with the principles of the present invention. The front side of the clamp bar, that is the side facing the belt S, is provided with a first clamping area, that preferably takes the form of a diamond knurled face and is designated by the reference numeral 41 in the drawings (see FIGS. 1, 5 and 6). The central panel 21 of the universal bracket 18 provides an opposing relatively stationary clamping area 42 (see FIGS. 1 and 2) against which the belt S is clamped when the clamping apparatus 10 is activated, as will be seen in detail below.

On the back side of the clamping bar 40, that is on the opposite side of the bar from the clamping area 41, is provided the unique universal rocking means that provides a self-aligning or self-compensating action of the present invention. This universal rocking means includes a first surface 45 forming this back side. When the clamp bar 40 is installed in the open channel 35, this first surface 45 faces a second flat surface 46, which is actually the inner or closed side of the channel 35. Thus, the second surface 46 is part of the channel retaining means for the clamp bar 40, as can best be seen in FIG. 1 of the drawings. Adjacent the top edge of the clamp bar 40 (in the mounted position) are dual retainer shoulders 47, 47a that cooperate with the upper lip 36; whereas, at the bottom of the clamp bar 40 is provided a single retainer shoulder 48 that cooperates with the lower retaining lip 37. The clamp bar 40 is retained against lateral or endwise movement by the ends abutting the side panels 22, 23 of the universal bracket 18.

A resilient compression strip 49 of rubber material or the like is carried between the inner retainer shoulder 47 and the upper lip 36. The outer retainer shoulder 47a is slanted and mates with the slanted outer face of the upper lip 36. When the clamp bar 40 is moved slightly upwardly, such as during clamping of the belt S, the strip 49 is resiliently compressed by limited caming action, as will be seen in more detail below.

Centrally located on the backside or surface 45 of the clamp bar 40 is a spherical dome 50 that provides the universal rocking or floating action of the clamp bar. The apex of the dome 50 contacts a point along the flat facing surface 46 in the retaining channel 35. Since there is only point contact, the entire clamp bar 40 can tilt or rock either in the direction of the belt, as represented by the dual arrow $A_1$ (FIG. 4), or transverse to the direction of the belt, as represented by the dual arrow $A_2$ (FIG. 4). As the clamp bar 40 rocks, the solid point contact is free to change by rolling along the facing surface 46 and/or sliding, as required. The resilient strip 49 is either compressed or expanded along its length to provide the action required.

The lower retainer shoulder 48 is free to float or move away from the lower lip 37, as may be required as the clamp bar 40 rocks or tilts. By the same token, the dual upper shoulders 47, 47a engaging the upper lip 36 tend to stabilize the clamp bar 40 in the channel 35. Either shoulder 47, 47a can also move toward or away from the lip 36 with a floating action as may be required by the compensating movement in the direction of either or a combination of the arrows $A_1$, $A_2$.

Thus, in the operation of the belt clamping apparatus 10 of the present invention, when the belt S is provided with a pulling force in the direction of arrow $A_3$ (FIG. 3) caused by the occupant of the vehicle being thrown forwardly or to one side with a force above a predetermined amount, such as in an accident, the belt S acts against the curved upper portion of the lever 27 tending to rotate the lever counterclockwise, as shown in FIG. 3. This counterclockwise rotation (note arrow $A_4$ in FIG. 3), in turn, moves the floating clamp bar 40 into contact with the belt S causing a frictional retention of the belt by engagement of the clamping areas 41, 42. As the force on the belt S is increased, the frictional clamping force is increased proportionally.

As soon as the clamp bar 40 contacts the belt S and touches the belt against the stationary clamping area 42, the belt is held captive between the two clamping areas 41, 42. As the pressure of the clamp bar 40 increases, the clamp bar 40 rocks immediately to the position where the maximum contact area is placed across the full width of the belt. If one side of the belt is relatively higher with respect to the clamping area 42, or thicker than the other, when the clamping action occurs, the clamp bar 40 immediately compensates for this by tilting in the appropriate direction (toward the lower side, see dual arrow $A_2$). On the other hand, if the upper or lower portion of the belt within the clamping area is relatively higher with respect to the area 42 or thicker than the other, the bar 40 immediately compensates for this by tilting toward the lower portion or in the direction of the arrow $A_1$, as required. Any combination of these two rocking or tilting actions are possible to compensate for variations in both directions, as is usually the case.

At the moment that the clamp bar 40 first fully clamps the belt S so as to arrest the movement of the belt, the bar 40 tends to move upwardly slightly. This action is caused by the mating cam surfaces of the upper lip 36 and the retainer shoulder 47a and momentarily further increases the clamping action. The existence of the resilient strip 49 advantageously absorbs the shock of the initial stopping action and helps to maintain the desired uniform clamping force across the full face of the clamping area. The multidirectional action of the point contact on the spherical dome 50 assures the maximum frictional gripping force across the full width and length of the clamping areas 41, 42. When the tension is released on the belt S, the lever 27 pivots under the force of the biasing spring 30 back to the original position (FIG. 1) and the clamp bar 40 returns to its home or relaxed position under the influence of the resilient strip 49, as is evident.

With the concept of the present invention including the point contact of the dome 50 with the facing surface 46, there is no need to make the mounting of the shaft 26 resilient, as required in the prior art. This greatly simplifies the construction and provides a self-aligning clamping apparatus that is independent of any tilting or skewing action of the clamping lever 27.

It should be noted that the web clamp apparatus may be provided in the form of a run through bracket mounted on a vehicle side wall or may be associated with a seat belt retractor, such as within the housing of a seat belt retractor. In addition, it should be noted that the dome surface may alternatively be provided on lever as opposed to the clamp bar.

In this disclosure, there is shown and described only the preferred embodiment of the invention, but as aforementioned, it is to be understood that the invention is capable of other and different embodiments, and its several details are capable of various obvious modifications, all without departing from the inventive spirit thereof.

What is claimed is:

1. In a belt clamping apparatus for a vehicle wherein a seat belt is moveable in a first direction to allow engagement with an occupant of the vehicle and in an opposite second direction to allow retraction, said clamping apparatus resisting movement of said belt to restrain the occupant when a force above a predetermined amount is applied to said belt in said first direction, said clamping apparatus including a lever pivotable on a shaft, mounting means for said shaft, said lever having a clamping position and a non-clamping position, and means for biasing said lever to said non-clamping position, the improvement comprising:

a clamp bar carried by said lever having a first clamping area for contacting a portion of said belt and clamping said belt against a corresponding second clamping area on said mounting means, means for retaining said clamp bar on said lever; and universal rocking means between a first surface on said clamp bar on the opposite side of said bar from said first clamping area and a second corresponding facing surface on said retaining means, said universal rocking means providing substantially point contact between said clamp bar and said lever, said clamping bar being universally moveable by said rocking means to apply a substantially uniform clamping force in all directions over the full area of contact with said belt.

2. The belt clamping apparatus of claim 1 wherein said retainer means for said clamp bar includes an open channel extending across said lever substantially parallel to said shaft, said clamp bar being positioned in said channel with said second surface being formed by the closed side of said channel.

3. The belt clamping apparatus of claim 2 wherein said rocking means is positioned on said first surface.

4. The belt clamping apparatus of claim 3 wherein said rocking means comprises a spherical dome positioned centrally on said first surface, said point contact occurring between said dome and said channel surface to provide the uniform clamping force along the full contact area with said belt.

5. The belt clamping apparatus of claim 1 wherein said rocking means comprises a dome.

* * * * *